United States Patent [19]

Grunsky

[11] Patent Number: 4,826,364
[45] Date of Patent: May 2, 1989

[54] ONE-PIECE ROTARY MATERIAL REMOVING TOOL OF SINTERED HARD METAL

[75] Inventor: Manfred Grunsky, Dreieich, Fed. Rep. of Germany

[73] Assignee: Stellram S.A., Nyon, Switzerland

[21] Appl. No.: 90,024

[22] Filed: Aug. 27, 1987

[30] Foreign Application Priority Data

Aug. 27, 1986 [DE] Fed. Rep. of Germany ....... 3629035

[51] Int. Cl.⁴ ............................................. B23B 51/00
[52] U.S. Cl. .................................... 408/59; 76/108 T; 408/230; 408/239 A
[58] Field of Search ................... 408/57, 59, 199, 200, 408/226, 231, 238, 239 A, 144, 227, 230; 76/108 T; 279/1 A

[56] References Cited

U.S. PATENT DOCUMENTS

| | | | |
|---|---|---|---|
| 1,191,717 | 7/1916 | Moore | 408/144 |
| 1,454,452 | 5/1923 | Moore | 408/144 |
| 2,405,298 | 8/1946 | Fleischer | 408/59 |
| 2,778,252 | 1/1957 | Oxford, Jr. | 408/230 |
| 2,986,960 | 6/1961 | Oxford, Jr. et al. | 408/59 |
| 3,216,107 | 11/1965 | Andreasson | 408/227 |

FOREIGN PATENT DOCUMENTS

| | | | |
|---|---|---|---|
| 114610 | 9/1981 | Japan | 408/199 |
| 571338 | 9/1977 | U.S.S.R. | 76/108 T |
| 580046 | 11/1977 | U.S.S.R. | 76/108 T |
| 1263441 | 10/1986 | U.S.S.R. | 408/199 |

OTHER PUBLICATIONS

Tool and Manufacturing Engineers Handbook, Fourth Edition, vol. 1, Machining, 1983, pp. 9-36 and 9-39.

Primary Examiner—Gil Weidenfeld
Assistant Examiner—Daniel W. Howell
Attorney, Agent, or Firm—Peter K. Kontler

[57] ABSTRACT

A one-piece rotary drill or end milling cutter is an extruded product made of sintered hard metal. The front end portion of its shank has one or more cutting edges and its rear end portion tapers in a direction away from the front end portion and is receivable with friction in a complementary conical socket of a rotary holder. The shank has one or more longitudinally extending coolant holes with a circular or triangular cross-sectional outline, and such hole or holes are formed in the course of the extruding step. The peripheral surface of the shank has one or more longitudinally extending chip evacuating grooves, and those portions of the grooves which are formed in the rear end portion of the shank contain fillers of bondable plastic material or solder.

10 Claims, 4 Drawing Sheets

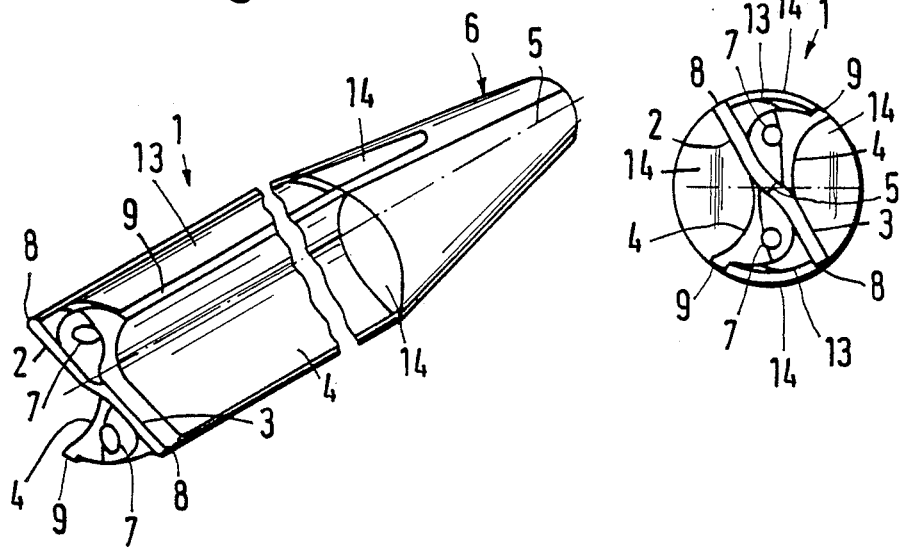
Fig. 1
Fig. 2
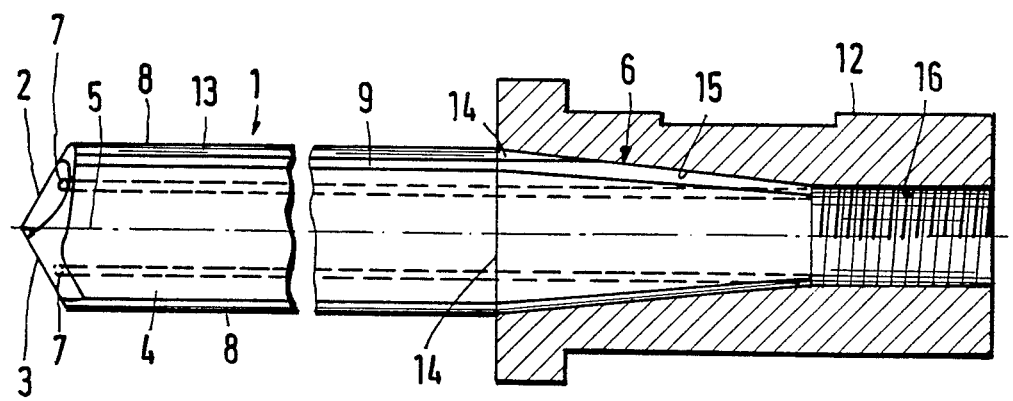
Fig. 3

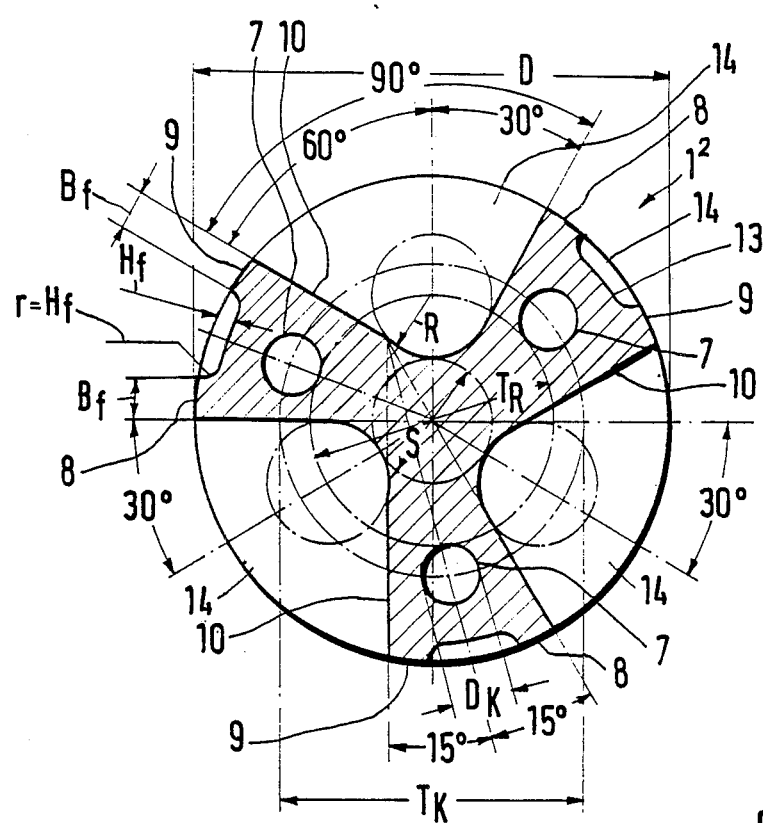
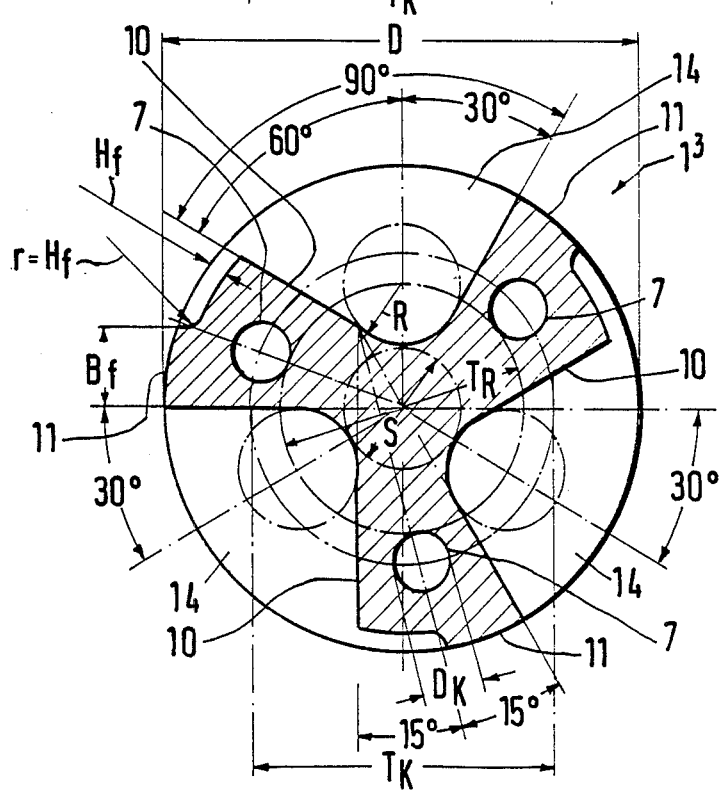

ONE-PIECE ROTARY MATERIAL REMOVING TOOL OF SINTERED HARD METAL

BACKGROUND OF THE INVENTION

The invention relates to improvements in one-piece rotary material removing tools, especially to improvements in one-piece drills and end milling cutters. More particularly, the invention relates to improvements in one-piece rotary material removing tools which are made of sintered hard metal.

It is already known to extrude sintered hard metal through an orifice which forms an elongated body which is ready to be cooled and to be thereupon converted into a drill or milling cutter. The conversion involves grinding the front end portion of the body to provide one or more cutting edges, grinding or otherwise treating the rear end portion of the body to impart thereto a shape which is suitable for insertion into the socket of a rotary holder, and to provide the body with one or more longitudinally extending chip evacuating grooves. The first step involves the making of a cylindrical blank of sintered material which is thereupon treated in a grinding machine or the like to provide it with one or more cutting edges, one or more grooves, and with a rear end portion which is capable of entering and of being properly retained in a rotary holder. The rear end portion of the blank has a cylindrical shape so that it can be adequately held in a drill chuck. A drawback of such prior proposals is that the cost of the tools is very high, and this is due primarily to the amount of material removing work which is required to form the cutting edge(s) and the chip evacuating groove(s).

A similar one-piece material removing tool is disclosed in German Offenlegungsschrift No. 17 52 616 wherein the chip evacuating groove or grooves are formed without the need for removal of material of the blank in a grinding machine or in a like material removing machine tool. The tool which is disclosed in this publication exhibits the drawback that it does not have any means for supplying coolant to the region where the cutting edge or edges remove material from the workpiece; therefore, the workpiece and/or the tool (especially in the region of the cutting edge or edges) is likely to be overheated after a relatively short interval of use. The rear end portion of the shank of the tool is forced into a cylindrical socket so that the edges bounding the chip evacuating grooves bite into the material of the holder. This creates problems during insertion of the tool into its holder.

German Offenlegungsschrift No. 25 12 854 discloses a further one-piece rotary material removing tool which has a longitudinally extending coolant hole. The body of the tool is a converted extruded hollow cylindrical blank whose cost, prior to conversion into a tool, exceeds the cost of an extruded one-piece tool of sintered hard metal. The cylindrical blank is extruded again in an operation which involves the consumption of large quantities of energy. The rear end portion of the thus treated blank is then soldered or welded to a conical tip which is receivable in the complementary conical socket of a rotary tool holder. Such operation is time-consuming and expensive because the tip is produced as a separate part which is thereupon bonded to the rear end portion of the hollow cylinder. Moreover, it is necessary to provide the tip with a hole which registers with the axial hole of the cylinder in order to ensure admission of coolant by way of the holder. The rear end portion of the hole in the cylinder and/or the passage in the tip is likely to be clogged, either entirely or in part, during welding or soldering of the tip to the cylinder.

One mode of preventing clogging of the coolant hole in a drill is disclosed in German Pat. No. 16 27 778 which proposes to drill one or more coolant holes into the shank of the tool and to weld a conical tip to the rear end portion of the shank. The channel is filled with solder which melts in the course of the welding operation. The cost of such tools is very high because it is necessary to drill one or more coolant holes and to separately produce a tip which is then welded to the rear end portion of the drilled shank. The introduction of solder into the predrilled hole or holes and into the passage or passages of the tip constitutes an additional time-consuming operation and contributes significantly to overall cost of the finished tool.

OBJECTS AND SUMMARY OF THE INVENTION

An object of the invention is to provide a simple and inexpensive one-piece rotary material removing tool wherein the portion which is to be received in the socket of a holder need not be produced in a separate step.

Another object of the invention is to provide a tool which (together with the workpiece) can be readily cooled by one or more streams of liquid media and whose rear end portion can be safely held in the holder even though it is readily removable from the holder when the need arises.

A further object of the invention is to provide an improved method of making the above outlined one-piece tool.

An additional object of the invention is to provide a tool wherein the rear end portion is or can be reinforced in a novel and improved way.

Still another object of the invention is to provide a tool which can be used as a drill or as a milling cutter and wherein the coolant hole or holes need not be drilled into the material of the shank.

The invention is embodied in a one-piece rotary material removing tool which can be used with particular advantage as a drill or as an end milling cutter. The improved tool comprises an elongated body of extruded and hardened sintered hard metal. The body includes a shank with a first end portion having at least one cutting edge and a conical second end portion which tapers in a direction away from the first end portion. The body is further provided with at least one longitudinally extending extruded coolant hole and with at least one longitudinally extending extruded external (peripheral) chip evacuating groove having an end portion in the second end portion of the shank. The body of the improved tool further comprises a filler in the end portion of the chip evacuating groove.

The body can further comprise at least one longitudinally extending extruded guide member which is adjacent the groove and extends radially outwardly beyond the groove. The aforementioned filler is adjacent one side of the guide member.

The body can comprise two longitudinally extending extruded guide members which are adjacent the groove, which extend radially of the body beyond the groove, and which define an elongated recess having an end portion in the second end portion of the shank.

Such tool preferably further comprises a second filler which fills the end portion of the recess. The filler(s) can contain a plastic material and can be bonded to the shank. Alternatively, at least one of the fillers can contain solder and is preferably bonded to the shank.

Each coolant hole can have a substantially triangular cross sectional outline, and such outline preferably includes a first corner or apex which is located at a first distance from the axis of the body and two additional corners or apices each located at a second distance from the axis of the body. Each second distance exceeds the first distance.

The radially innermost portion of each coolant hole, especially a hole having a triangular cross-sectional outline, is located at a first distance from the axis of the body, and the radially innermost portion of the groove is preferably located at a greater second distance from such axis. The body can have a plurality of coolant holes and/or a plurality of chip evacuating grooves.

The novel features which are considered as characteristic of the invention are set forth in particular in the appended claims. The improved tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a one-piece rotary material removing tool which embodies one form of the invention;

FIG. 2 is a front elevational view of the tool which is shown in FIG. 1;

FIG. 3 is a fragmentary elevational view of the tool and an axial sectional view of a holder for the second end portion of the shank;

FIG. 6 is a similar cross-sectional view of a third tool;

FIG. 7 is a similar cross-sectional view of a fourth tool; and

DESCRIPTION OF THE PREFERRED EMBODIMENTS

Figure 4:
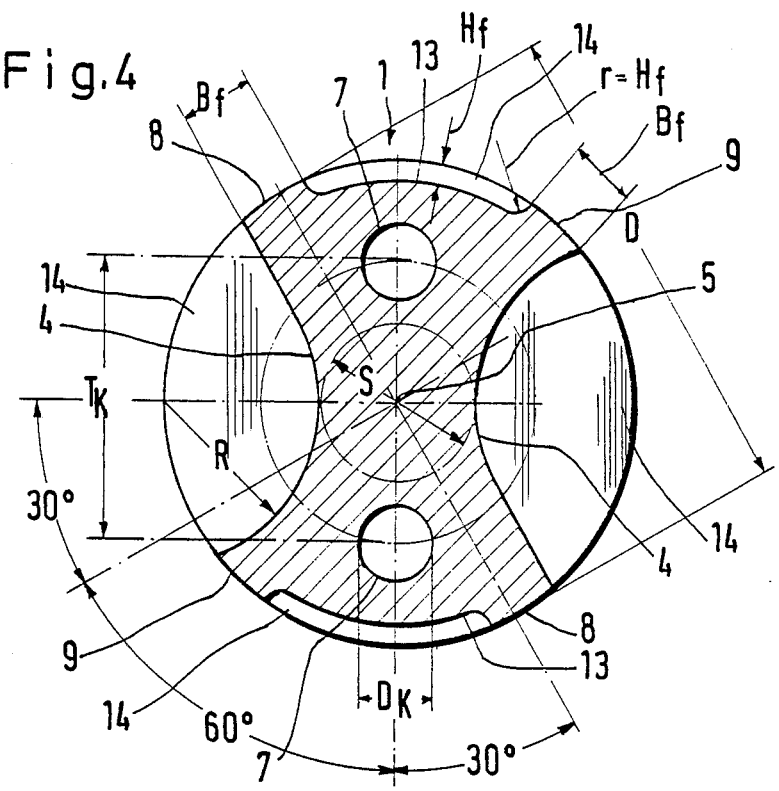
FIG. 4 is an enlarged cross-sectional view of the shank of the tool of FIGS. 1 to 3.

FIGS. 1 to 4 show a rotary material removing tool which comprises an elongated body 1 made of sintered hard metal and formed in an extruder. The body 1 includes an elongated shank having a front end portion with two cutting edges 2, 3 and a conical rear end portion 6 which tapers in a direction away from the front end portion. The only parts which invariably require removal of material upon completion of the extruding and sintering operations are the cutting edges 2, 3 which are or can be formed in a grinding machine. The shank further comprises two external longitudinally extending flutes or grooves 4 which serve for the evacuation of chips and are disposed diametrically opposite each other with reference to the axis of rotation 5 of the tool. The rear end portion 6 of the shank of the body 1 can receive its conical shape in a grinding machine, and its configuration is selected to ensure that the portion 6 can fit snugly into the complementary conical socket 15 of a rotary tool holder 12. The deepest portion of the conical socket 15 communicates with the forward end of a tapped bore 16 which can receive a threaded member (not shown) serving to expel the end portion 6 from the socket 15 when the need for expulsion arises.

The shank of the body 1 further comprises two longitudinally extending eccentric coolant holes 7 which are disposed at opposite sides of the axis 5 and have discharge ends in the region of the cutting edges 2, 3. Such holes receive a suitable coolant by way of the tapped bore 16 in the rear portion of the holder 12. Each of the holes 7 has a substantially circular cross-sectional outline, and these holes are formed in the course of the extruding step, i.e., it is not necessary to use a slender drill as a means for making coolant bores in the hardened body 1. The major part of the shank of the body 1 has a substantially cylindrical outline save in the region of the chip evacuating grooves 4 which extend all the way to the front end face of the front end portion as well as into the rear end portion 6 of the shank. The grooves 4 alternate with pairs of rib-shaped longitudinally extending guide members 8, 9 whose radially outermost portions contact the surface of the bore which is being drilled by the tool so as to reduce the area of frictional contact between the tool and the workpiece.

The pairs of guide members 8, 9 flank elongated recesses 13 which extend all the way into the conical rear portion 6. The rear end portions of the grooves 4 and recesses 13 contain fillers 14 which are introduced into and hardened in the respective grooves and recesses prior to grinding of the shank to form the conical rear end portion 6. Therefore, the entire end portion 6 has an uninterrupted conical external surface and is in large surface-to-surface contact with the surface bounding the complementary conical socket 15 in the holder 12. The fillers 14 in the rear portions of the grooves 4 and recesses 13 prevent coolant, which is admitted via tapped bore 16, from flowing along the surface bounding the socket 15 and from entering the rear portions of the grooves 4 and recesses 13, i.e., the fillers 14 compel the coolant to flow only into the rear end portions of the coolant holes 7 and to issue from the shank of the body 1 in the region of the cutting edges 2 and 3. Frictional engagement between the conical rear end portion 6 of the shank of the tool and the holder 12 is enhanced when the tool is in actual use, i.e., when the front end portion of the shank is forced to penetrate into the material of a workpiece so that the conical surface bounding the end portion 6 bears against the complementary conical surface around the socket 15.

The fillers 14 can be made of a two-component plastic material which is readily bondable to the material of the end portion 6 and hardens in response to cooling. It is also possible to make the fillers 14 of a suitable solder which is bonded to the adjacent surfaces of the rear end portion 6 to fill the rear end portions of the grooves 4 and recesses 13.

When the tool of FIGS. 1 to 4 is in use, the holder 12 is mounted in and is rotated by a drill chuck, not shown. If the holder 12 is removed from the chuck and the operator wishes to expel the rear end portion 6 of the shank from the socket 15, a threaded member (such as a screw) is driven into the tapped bore 16 to bear against the rear end face of the shank and to expel the conical end portion 6 from the holder.

The presently preferred configuration of the improved tool can be ascertained with reference to the following table wherein S denotes the core diameter, $B_f$ denotes the width of the guide members 8 and 9 (as measured in the circumferential direction of the shank), $H_f$ denotes the height of the guide members 8, 9 (as measured in the radial direction of the shank), $T_K$ denotes the diameter of the circle including the centers of the coolant holes 7, and $D_K$ denotes the diameters of the cooling holes 7. D is the diameter of the extruded blank, and R is the radius of curvature of the surfaces bounding the grooves 4. All of the dimensions given in the table are in millimeters.

| D  | R    | S   | $B_f$ | $H_f = r$ | $T_K$ | $D_K$ |
|----|------|-----|-------|-----------|-------|-------|
| 3  | 1    | 1   | 0.5   | 0.2       | 1.5   | 0.5   |
| 4  | 1.25 | 1.5 | 0.7   | 0.2       | 2.3   | 0.6   |
| 5  | 1.5  | 2   | 0.9   | 0.3       | 2.8   | 0.8   |
| 6  | 2    | 2   | 1     | 0.3       | 3.4   | 1     |
| 7  | 2.5  | 2   | 1.2   | 0.3       | 4.4   | 1.2   |
| 8  | 2.5  | 3   | 1.3   | 0.4       | 4.7   | 1.3   |
| 9  | 3    | 3   | 1.5   | 0.4       | 5.3   | 1.4   |
| 10 | 3.5  | 3   | 1.7   | 0.4       | 5.8   | 1.5   |
| 11 | 3.5  | 4   | 1.8   | 0.5       | 6.3   | 1.6   |
| 12 | 4    | 4   | 2     | 0.5       | 7     | 1.8   |

If the drill is rotated at a low RPM, the guide members 8 and 9 can be omitted so that the recesses 13 are not formed at all and the tool is provided with fillers 14 only in the rear portions of its grooves 4. In other words, the peripheral surface of the major part of the shank of the body 1 has a diameter D all the way between the grooves 4. This establishes a large-area contact with the surface bounding the bore which is being drilled.

It is further possible to omit the guide members 9 (i.e., those guide members which are not immediately adjacent the cutting edges 2 and 3), particularly if the tool is driven at a very high RPM. This further reduces the area of contact between the rotating tool and the workpiece.

It is also within the purview of the invention to sharpen those edges of the guide members 8 which are adjacent the respective cutting edges 2, 3 so that the guide members 8 then constitute auxiliary cutters.

An advantage of the configuration of the tool which is shown in FIGS. 1 to 4, and particularly in FIG. 4, is that the still soft blank which issues from the extruder can be readily supported in the course of the hardening step without undergoing any or without undergoing any appreciable deformation due to its own weight. All that is necessary is to extrude the blank of hard metal along a cylinder which extends into one of the grooves 4 and has a radius (R) corresponding to the radius of the extruded blank. Such radius can equal the radius of curvature of surfaces bounding the grooves 4.

Figure 5:
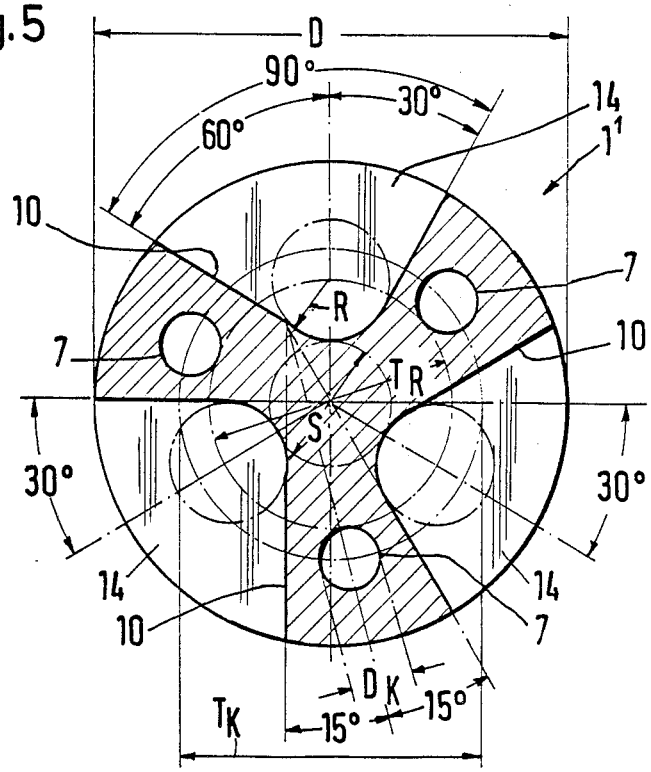
FIG. 5 is a similar cross-sectional view of a second tool.

FIGS. 5, 6 and 7 respectively show rotary one-piece material removing tools $1^1$, $1^2$ and $1^3$ each of which has three cutting edges (not specifically shown) and a corresponding number of chip evacuating grooves 10 and coolant holes 7. The orientation of cutting edges at the front end of each of these tools is conventional and is not shown in FIGS. 5 to 7.

The tool $1^1$ of FIG. 5 is designed for operation at a low RPM and, therefore, its shank does not have any guide members corresponding to the ribs 8, 9 of the tool 1 shown in FIGS. 1 to 4. The tool $1^2$ of FIG. 6 is designed for operation at a higher RPM and, therefore, its grooves 10 alternate with pairs of circumferentially spaced apart longitudinally extending guide members 8, 9. The tool $1^3$ of FIG. 7 is designed for operation at still higher speeds and, therefore, its shank has discrete guide members $1^1$ alternating with the chip evacuating grooves 10. Those edges of the guide members 8 shown in FIG. 6 which are adjacent the respective cutting edges can be sharpened, and the same applies for those edges of the guide members 11 which are adjacent the respective cutting edges of the tool $1^3$. Thus, each of the guide members 8 in FIG. 6 and each of the guide members 11 in FIG. 7 can constitute an auxiliary cutter. Analogously, those portions of the surfaces bounding the grooves 10 in the shank of the tool $1^1$ which are adjacent the periphery of the shank and are also adjacent the respective cutting edges are or can be sharpened to ensure that the tool $1^1$ is provided with three auxiliary cutters.

The following equations are valid for each of the tools $1^1$, $1^2$, and $1^3$:

$S = \frac{1}{4}D$; $T_R = \frac{1}{2}D$; $R = \frac{1}{4}D$; $T_K = \frac{5}{8}D$ and $D_K = \frac{1}{8}D$
($T_R = S + 2R$).

In the tool $1^2$ of FIG. 6, $B_f$ equals 1/12D; in the tool $1^3$ of FIG. 7, $B_f$ equals 1/6D.

The value of $H_f$ is the same in each of the tools 1, $1^2$ and $1^3$.

It is necessary to provide specially designed supports during sintering of extruded blanks which are converted into the tools $1^1$, $1^2$ and $1^3$ of FIG. 5, 6 and 7, respectively. Such specially designed supports prevent deformation of still soft blanks which issue from the extruder, especially in the regions corresponding to those between the grooves 10 in the finished tools. The tendency of blanks to undergo deformation is attributable to the weight of the extruded material. Nevertheless, it is often desirable and necessary to make tools of the type shown in FIGS. 5 to 7 because each of these tools can be more accurately centered in the drilled hole or bore since it contacts the surface surrounding the bore or hole at three or more locations which are spaced apart from one another in the circumferential direction of the tool. The centering action is particularly satisfactory if the tool has three pairs of guide members (note the guide members 8, 9 in FIG. 6).

Figure 8:
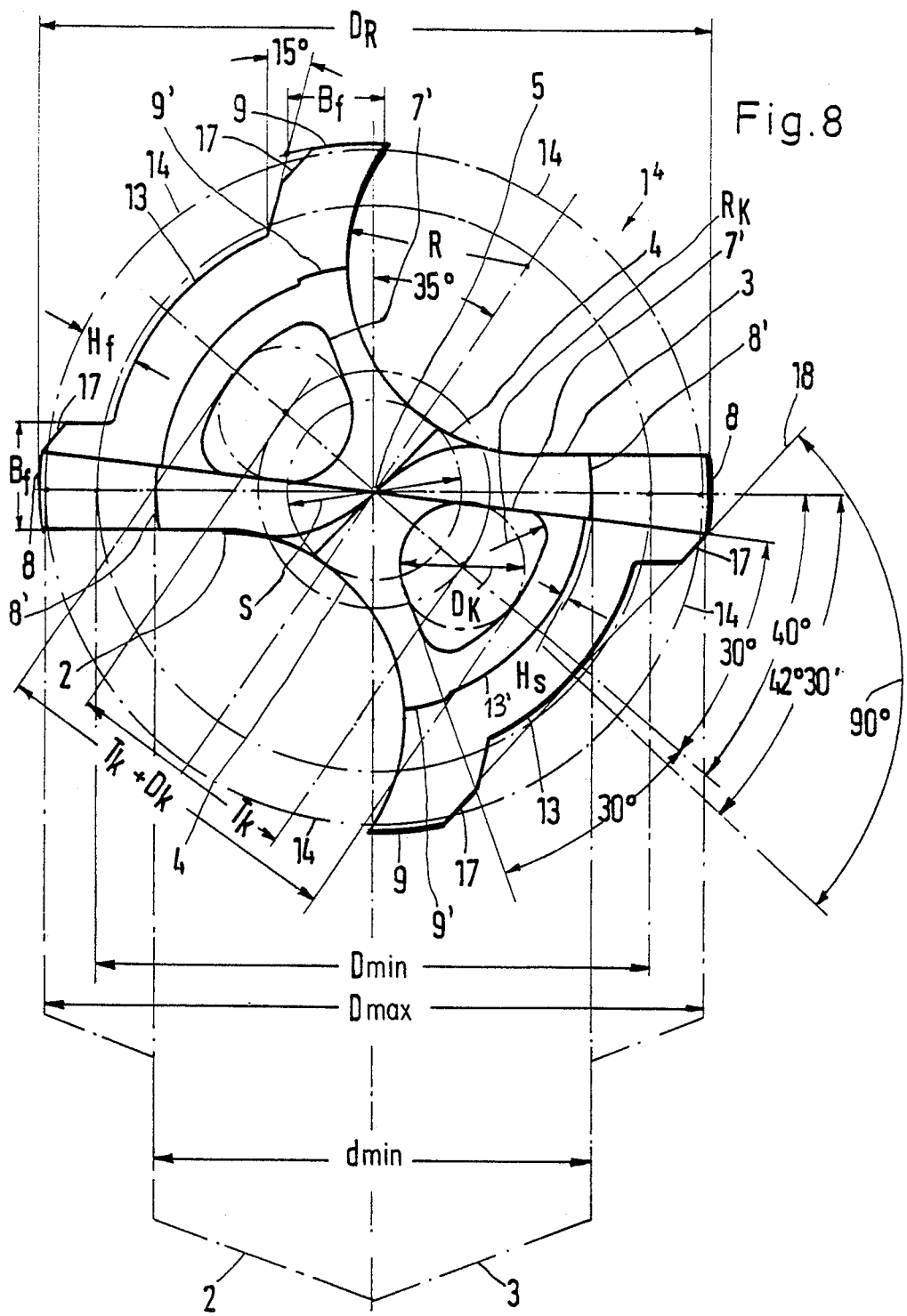
FIG. 8 is an enlarged front elevational view of a fifth tool.

FIG. 8 shows a fifth one-piece rotary material removing tool $1^4$, and more particularly an extruded blank of hard metal prior to introduction of fillers 14 (indicated by phantom lines) into the rear end portions of the chip evacuating grooves 4. The tool including the blank of FIG. 8 is similar to the tool 1 of FIGS. 1 to 4 except that it is designed for the drilling of holes having portions of different diameters. Moreover, the coolant holes 7' of the blank which is shown in FIG. 8 have a substantially triangular outline with one rounded corner of the outline located radially inwardly of the circle (with the diameter S) whose center is located on the axis 5 and which includes the deepmost portions or points of the grooves 4. The radius ($D_K/2$) of curvature of the surface bounding the radially innermost corner or apex of the outline of each coolant hole 7' is greater than the radii $R_K$ of the surfaces bounding the other two (more distant) corners of each outline. Furthermore, the corners of rounded surfaces bounding the two more distant corners of the outlines of holes 7' are located outside of the respective circles with diameters $D_K$. Such cross-sectional outline ensures that each hole 7' can convey a large quantity of coolant, namely a quantity larger than that which can flow through a cylindrical hole with a diameter $D_K$. Moreover, the holes 7' are nearer to the axis 5 than the cylindrical holes 7 in the tool 1 of FIGS.

1 to 4. This ensures that the inlet ends of the holes 7' in the rear end portion of the shank of the tool $1^4$ will remain exposed even if the pear end portion of such shank constitutes a relatively long and slender cone which is in large-area frictional contact with the surface bounding the complementary conical socket in the holder for the tool $1^4$. If the cross-sectional area of a hole 7' is reduced to match or approximate that of a cylindrical hole 7 with a diameter $D_K$, the holes 7' can be placed even nearer to the axis 5 without risking that their inlet ends would be sealed by the surface bounding the conical socket of the holder for the rear end portion of the shank of the tool $1^4$. Such reduction of the cross-sectional areas of holes 7' involves a reduction of the radii $D_K/2$ and $R_K$.

The diameter ($d_{min}$) of the front stage or step of the multi-stage tool $1^4$ can be reduced in response to a reduction of the cross-sectional area of the holes 7' and the placing of such holes nearer to the axis 5. The maximum diameter of the larger-diameter stage of the tool $1^4$ is shown at $D_{max}$. The diameter of this larger-diameter stage can vary within a wide range anywhere between $D_{min}$ and $D_{max}$.

The rib-like guide members 8 and 9 of the tool $1^4$ can be provided with facets or flats 17 which are adjacent the respective recesses 13 and are disposed in planes 18 extending tangentially of the central portions of convex bottom surfaces in the respective recesses 13. The facets 17 are engaged by complementary surfaces of three supports during extrusion of the blank which is to form the tool $1^4$. Three supports with surfaces in the planes 18 suffice to reliably prevent deformation of the freshly extruded blank and to properly prop the blank during setting.

The front stage of the tool $1^4$ can also comprise two pairs of guide members 8', 9' flanking axially parallel recesses 13' each of which has a depth $H_S$. This front stage has the diameter $d_{min}$.

The presently preferred dimensions of the tool $1^4$ are listed in the enclosed table wherein $D_R$ denotes the diameter of the extruded blank and the dimensions are again given in millimeters.

with the holder. The front end portion of the tool (and the workpiece) is adequately cooled because the tool is provided with one or more coolant holes which need not be drilled into the material of the tool but are formed as a result of extrusion of hard metal. It is not necessary to produce the conical rear end portion of the shank in a separate step and to thereupon bond such separately produced rear end portion to the intermediate portion of the shank. The conicity of the rear end portion can be readily selected with a view to ensure that the tool will share all angular movements of the holder as well as that the rear end portion can be readily expelled from the holder, if and when necessary. The area of frictional engagement between the conical rear end portion and the holder is enlarged as a result of the provision of fillers 14, and the torque-transmitting connection between the tool and the holder becomes more reliable when the tool is in use because the front end portion of the shank bears against the workpiece and its conical rear end portion is thereby urged into the socket. The fillers 14 perform several desirable functions, namely increasing the area of contact between the conical rear end portion of the shank and the holder, reinforcing the conical rear end portion, ensuring that the holder can rotate the tool without slippage, and ensuring that the coolant which is admitted through the tapped bore of the holder is compelled to enter the inlet ends of the coolant holes and cannot leak along the surface bounding the socket of the holder. This applies for the fillers 14 in the inner end portions of the chip evacuating grooves as well as for those fillers which fill the recesses (if any) between pairs of neighboring guide members.

The material of the fillers 14 is selected with a view to ensure that it can form a strong bond with the sintered hard metal of the shank and also that it can be readily introduced into the rear end portions of the recesses and/or grooves and can set to form an integral part of the finished tool. Numerous available plastic and metallic materials can be used to form the fillers 14.

Without further analysis, the foregoing will so fully reveal the gist of the present invention that others can,

| Diameter range | | | Coolant hole | | | | | | | Stage diameter | | Utilization |
|---|---|---|---|---|---|---|---|---|---|---|---|---|
| $D_R$ | $D_{min}$ | $D_{max}$ | S | R | $B_f$ | $H_f$ | $T_K$ | $D_K$ | $R_K$ | $d_{min}$ | $H_s$ | |
| 4.3 | 3.5 | 4.2 | 1.12 | 1.16 | 0.66 | 0.40 | 1.49 | 0.83 | 0.16 | 2.80 | 0.02 | M 3.5 |
| 5.0 | 4.1 | 4.9 | 1.31 | 1.35 | 0.77 | 0.46 | 1.73 | 0.97 | 0.19 | 3.27 | 0.025 | M 4 |
| 5.9 | 4.8 | 5.75 | 1.54 | 1.59 | 0.91 | 0.54 | 2.04 | 1.13 | 0.22 | 3.83 | 0.03 | M 5 |
| 6.9 | 5.65 | 6.76 | 1.80 | 1.86 | 1.06 | 0.64 | 2.39 | 1.33 | 0.26 | 4.50 | 0.05 | M 6 |
| 8.1 | 6.65 | 7.95 | 2.12 | 2.19 | 1.25 | 0.75 | 2.81 | 1.57 | 0.31 | 5.30 | 0.05 | |
| 9.6 | 7.85 | 9.4 | 2.51 | 2.59 | 1.48 | 0.89 | 3.33 | 1.85 | 0.37 | 6.20 | 0.1 | M 8 |
| 11.3 | 9.3 | 11.1 | 2.96 | 3.06 | 1.75 | 1.05 | 3.93 | 2.19 | 0.43 | 7.40 | 0.1 | M 10 |
| 13.3 | 11 | 13.1 | 3.50 | 3.62 | 2.06 | 1.24 | 4.64 | 2.56 | 0.51 | 8.73 | 0.15 | M 12 |
| 15.8 | 13 | 15.6 | 4.17 | 4.31 | 2.46 | 1.47 | 5.52 | 3.07 | 0.61 | 10.4 | 0.15 | (M 14) |
| 18.8 | 15.5 | 18.6 | 4.97 | 5.13 | 2.93 | 1.76 | 6.58 | 3.66 | 0.73 | 12.4 | 0.2 | M 16 |

As can be seen in FIG. 8, the difference between $d_{min}$ and $D_{min}$ (and especially between $d_{min}$ and $D_{max}$) can be quite pronounced, i.e., the diameter of the smaller diameter portion of the bore which is to be drilled with the tool $1^4$ can be much smaller than that of the larger-diameter portion of the bore.

An advantage of the improved tool is that it can be produced at a reasonable cost in the form of a one-piece extruded blank which is thereupon caused to set and is formed with cutting edges and conical rear end portion and provided with fillers 14 (prior to grinding of the rear end portion) so as to increase the area of contact by applying current knowledge, readily adapt it for various applications without omitting features that, from the standpoint of prior art, fairly constitute essential characteristics of the generic and therefore, such adaptations should and are intended to be comprehended within the meaning and range of equivalence of the appended claims.

I claim:

1. A one-piece rotary material removing tool, particularly for use in a tool holder as a drill or end milling cutter, comprising an elongated body of extruded sintered hard metal including a shank with a first end portion having at least one cutting edge and a smooth conical second end portion tapering in a direction away from said first end portion and receivable with friction in a complementary smooth socket of the tool holder, said body further having at least one longitudinally extending extruded coolant hole having a substantially triangular cross-sectional outline, and at least one longitudinally extending external chip evacuating groove having an end portion in the second end portion of said shank, the cross-sectional outline of said hole having a first corner disposed at a first distance from the axis of said body and two additional corners disposed at second distances from said axis, each of said second distances exceeding said first distance, said body also comprising at least one longitudinally extending extruded guide member adjacent said groove and extending substantially radially of the body; and a filler disposed in the end position of said groove adjacent one side of said guide member to enlarge the area of contact between said shank and the tool holder and to prevent penetration of coolant into the end portion of said groove, said filler containing a plastic material and being bonded to said shank.

2. The tool of claim 1, wherein said body comprises two longitudinally extending guide members adjacent said groove, extending radially of the shank and defining an elongated recess having an end portion in the second end portion of said shank, and further comprising a second filler in the end portion of said recess.

3. The tool of claim 1, wherein said filler contains solder and is bonded to said shank.

4. The tool of claim 1, wherein said hole has a radially innermost portion disposed at a first distance from the axis of said body, said groove having a radially innermost portion disposed at a second distance from said axis, said second distance exceeding said first distance.

5. The tool of claim 1, wherein said body has a plurality of coolant holes and a plurality of grooves.

6. A method of making a one-piece rotary material removing tool, particularly for use in a tool holder as a drill or end milling tool, comprising converting by extrusion a mass of sinterable metal into an elongated body with at least one extruded coolant hole extending from end to end of the body and with at least one longitudinally extending external chip evacuating groove; sintering the body; introducing a filler into the groove at one end of the body; removing material from the one end of the body to impart thereto the shape of a smooth-surfaced cone tapering in a direction away from the other end of the body and receivable and retainable by friction in a complementary smooth-surfaced socket of a tool holder; and providing the other end of the sintered body with at least one cutting edge.

7. The method of claim 6, wherein the filler is hardenable and further comprising the step of hardening the filler prior to said material removing step so that the filler is permanently embedded in the groove.

8. A one-piece rotary material removing tool, particularly for use in a tool holder as a drill or end milling cutter, comprising an elongated body of extruded sintered hard metal including a shank with a first end portion having at least one cutting edge and a smooth conical second end portion tapering in a direction away from said first end portion and receivable with friction in a complementary smooth socket of the tool holder, said body further having at least one longitudinally extending extruded coolant hole and at least one longitudinally extending external chip evacuating groove having an end portion in the second end portion of said shank, said hole having a substantially triangular cross-sectional outline with a radially innermost portion disposed at a first distance from the axis of said body, said groove having a radially innermost portion disposed at a second distance from said axis and said second distance exceeding said first distance, said body also comprising at least one longitudinally extending extruded guide member adjacent said groove and extending substantially radially of the body; and a filler disposed in the end portion of said groove adjacent one side of said guide member to enlarge the area of contact between said shank and the tool holder and to prevent penetration of coolant into the end portion of the groove, said filler containing solder and being bonded to said shank.

9. The tool of claim 10, where said filler contains a plastic material and is bonded to said shank.

10. The tool of claim 8, wherein said outline has a first corner disposed at a first distance from the axis of said body and two additional corners disposed at second distances from said axis, each of said second distances exceeding said first distance.

* * * * *